United States Patent [19]

Umehara

[11] Patent Number: 4,623,436
[45] Date of Patent: Nov. 18, 1986

[54] METHOD AND APPARATUS FOR REMOVING IMPURITIES FROM LIQUIDS

[75] Inventor: Yoshio Umehara, Hoya, Japan

[73] Assignee: Showakoki Co., Ltd., Tokyo, Japan

[21] Appl. No.: 817,690

[22] Filed: Jan. 10, 1986

[30] Foreign Application Priority Data

Jan. 10, 1985 [JP] Japan .................................. 60-2413
Apr. 24, 1985 [JP] Japan ................................ 60-88399
Sep. 27, 1985 [JP] Japan .............................. 60-214208

[51] Int. Cl.$^4$ .............................................. C02F 1/46
[52] U.S. Cl. .................................... 204/149; 204/131;
204/194; 204/277; 204/305; 204/306; 210/748
[58] Field of Search ............... 204/194, 131, 149, 305,
204/306, 277; 210/748

[56] References Cited

U.S. PATENT DOCUMENTS

| 3,444,062 | 5/1969 | Felici et al. | 204/131 |
| 3,664,951 | 5/1972 | Armstrong | 204/748 |
| 3,673,065 | 6/1972 | Anderson | 210/748 |
| 3,888,751 | 6/1975 | Minegishi | 210/748 |
| 3,933,606 | 1/1976 | Harms | 210/748 |
| 4,071,447 | 1/1978 | Ramirez | 210/748 |
| 4,101,409 | 7/1978 | Austin | 204/149 |
| 4,120,765 | 10/1978 | King | 204/149 |
| 4,149,953 | 4/1979 | Rojo | 204/149 |
| 4,205,966 | 6/1980 | Horikawa | 210/748 |
| 4,224,148 | 9/1980 | Lindmann et al. | 210/748 |

FOREIGN PATENT DOCUMENTS 3031773 2/1982 Fed. Rep. of Germany ...... 210/748

Primary Examiner—Arthur P. Demers
Attorney, Agent, or Firm—Finnegan, Henderson, Farabow, Garrett & Dunner

[57] ABSTRACT

In a method and apparatus for removing impurities from a liquid, the liquid containing impurities is supplied to an electrolytic bath at a pressure higher than atmospheric pressure. Electrolysis is performed by applying a voltage to electrodes consisting of a metal which easily dissolves upon electrolysis. The liquid is then exposed to atmospheric pressure, and is treated in a flotation separation tank. Fine bubbles formed during the treatment of the liquid in the flotation separation tank attach to the impurities flocculated in the liquid by electrolysis. The flotation separation of the flocculated impurities is performed very efficiently, and high-purity water can be recovered.

The apparatus comprises an electrolytic bath consisting of a pressure vessel, in which electrodes of a metal which easily dissolves upon electrolysis are housed, and a constant current source for applying a voltage to said electrodes so as to obtain a predetermined current density in a liquid contained in said electrolytic bath, wherein impurities in the liquid are caused to flocculate by a hydroxide of the metal.

9 Claims, 11 Drawing Figures

METHOD AND APPARATUS FOR REMOVING IMPURITIES FROM LIQUIDS

BACKGROUND OF THE INVENTION

1. Field of the Invention

The present invention relates to a method and apparatus for removing impurities such as suspended or dissolved substances from a liquid.

2. Description of the Prior Art

Ultra-pure water has recently come to be used in the manufacture of electronic appliance parts, medical appliance parts, and high-purity chemical products.

Such water, however, is only available at high cost. If a large amount of high-purity water is used, manufacturing costs are increased. In view of this, it has been proposed to remove impurities from used water so that it can be reused.

Even if the water is not reused, it must be purified to comply with water quality standards provided by the Water Pollution Preventive Act.

In addition, if untreated water such as underground water or river water can be purified to a satisfactory degree, the high product costs including purchasing of high-purity water can be reduced.

When dust or the like from the grinding of wafers such as silicon or gallium arsenide wafers in the semiconductor process becomes mixed in with water as an impurity, the dust is dispersed as colloidal particles.

In this case, the dust is suspended in the water and cannot be removed by normal filtering.

In reverse osmosis or ultrafiltration which is used in the manufacture of the ultra-pure water required in large quantities in the electronics industry and in particular in the manufacture of VLSIs, the substances most responsible for deposition on the filtering membrane or permeation membrane and degradation of filtering efficiency are believed to be silicic acid ions ($HSiO_3^-$ or $SiO_3^{2-}$) dissolved in untreated water and the colloidal silicic acid suspended therein. The silicic acid colloidally suspended in the water is known to be converted upon reaction with water into orthosilicic acid, metasilicic acid, or metabisilicic acid to metatetra silicic acid. All of these substances can be dissolved in neutral water in only trace amounts, and are scarcely converted into silicic acid ions (e.g., $SiO_3^{2-}$ or $SiO_4^{2-}$). it is difficult to remove colloidal silicic acid with a method using an anion exchange resin. In addition, that method can provide only a low adsorption rate of silicic acid ions and requires several passes of the untreated water through the ion exchange resin layer for the removal of ions. Still worse, other substances or ions such as $Cl^-$, $SO_4^{2-}$, or $CO_3^{2-}$ are preferentially removed and the pH of the water is increased to cause some troubles.

In order to remove solids from suspension, the suspended solids must be flocculated prior to filtration. This also applies to solutions containing a solute such as an organic substance.

Electrolysis is known as a first conventional method of flocculating impurities. In electrolysis, sulfuric acid or the like is added to a liquid in order to enhance the electrical conductivity of the liquid. Metal plates which cannot easily be corroded by electrolysis, e.g., plates obtained by coating lead with titanium, are used as electrodes.

A substance, when suspended in water, is normally charged. Therefore, the suspended substance is electrically neutralized and flocculated by the electrodes. A substance flocculated in this manner floats in fine bubbles of hydrogen or oxygen, and the floating flocculated substance can then be separated by filtration.

In the case of electrolysis, the electrolysis of a liquid is performed at atmospheric pressure using electrodes consisting of a soluble metal.

Japanese Patent Publication No. 59-5032 discloses a discontinuous method. In this method, a liquid contained in a pressure-resistant container is subjected to electrolysis under pressure. After performing electrolysis for a predetermined period of time, the pressure in the container is returned to normal pressure. Fine bubbles formed upon this pressure change attach to the floc and cause it to rise to the liquid surface. The floc can then be removed.

As a second conventional method of flocculating impurities, a large amount of a substance having a high degree of ionization such as a strong electrolyte, a strong acid, or a strong base is added to a liquid.

In that method, suspended substances are electrically neutralized, flocculated and then settled by the ion generated in electrolytic dissociation.

As a third conventional method of flocculating impurities, a base is added to a liquid after adding a water soluble metal salt. In this method, a metal hydroxide produced by neutralization between the metal salt and the base adsorbs impurities and precipitate them by flocculation. Therefore, the third method is effective for liquids containing as an impurity a soluble substance less charged such as organic substance as well as suspended substance.

In the conventional method wherein a liquid is electrolyzed at atmospheric pressure, a large amount of hydrogen gas is produced at the cathode. The amount of hydrogen gas produced is calculated by electrochemical equivalency to be 417.8 ml/hour per 1 A of current at 20° C. and 1 atm. Hydrogen gas dissolves by 0.0182 ml per 1 ml of water at 20° C. and 1 atm. In practice, however, most fine bubbles of hydrogen gas immediately join together and rise as large bubbles having a diameter of more than about 0.5 mm. For this reason, only a small proportion of the bubbles attach to impurities flocculated by the hydroxide and contribute to the flotation seperation. Assuming that a large tank having a sectional area of 0.05 m$^2$ is used for 1L/min of liquid, about 95% of the total impurities in the liquid can be separated from the liquid surface, about 5% remains deposited on the tank bottom, and about 0.01% remains dissolved or suspended in the liquid unrecovered. Unless re-filtered through a filtering material having a mesh of about 0.5 μm, pure water cannot be obtained and the consumption of filtering material becomes considerable.

With the second method, the added substance remains in the liquid at a high concentration as an additional impurity. Therefore, even if the suspended substance is completely separated, the treated water cannot be used for intended purposes without further treatments.

In the third method, the concentration of metal salt as a separation additive is low. However, further ions are produced in the liquid upon neutralization. Again, with the third method, the treated water cannot be used directly for intended purposes.

In order to allow the repeated use of pure water, ions produced in each purification process must be removed before reusing the water. Thus, a large amount of ion exchange resin must be used, and costs are increased and the advantage of reusing pure water is not realized.

A large quantity of ions also remains unfiltered in the first and second methods. In addition, the solid residue separated by flocculation contains large quantities of electrolytes or metal hydroxides. For this reason, melting or recrystallization of silicon wafers grinding dust cannot be performed, and the solid residue cannot be reused effectively, the residue being almost of no utility.

Furthermore, the known method of electroyzing a liquid under pressure is a discontinuous process as described above, and a continuous treatment method is preferable.

OBJECTS AND SUMMARY OF THE INVENTION

In view of the foregoing it is an object of the invention to provide a method and apparatus for removing impurities from a liquid, in which impurities in a liquid having a low electrical conductivity can be flocculated without decreasing the purity of the liquid, and attachment of other substances to the impurities can be prevented.

According to the present invention, there is provided a method of removing impurities from a liquid, comprising the steps of:

forming electrodes using a metal which easily dissolves upon electrolysis and produces a hydroxide;

installing the electrodes in a pressure vessel;

continuously supplying a liquid containing impurities from an inlet of the pressure vessel at a pressure higher than atmospheric pressure;

continuously discharging the liquid from an outlet of the pressure vessel to an inlet of a tank at atmospheric pressure;

continuously exhausting the liquid from an outlet of the tank;

performing electrolysis by applying a voltage to the electrodes while the liquid is passed through the pressure vessel, thereby allowing the impurities to flocculate; and passing the liquid through the pressure vessel and the tank, wherein the then produced fine bubbles attach to the flocculated impurities to rise to the surface and seperate the impurities.

Preferably, the impurities in the liquid consist of silicic acid ions and colloidal silicic acid, the electrodes consist of one of aluminum, zinc, and magnesium, and the voltage is applied between the electrodes to provide a current density of 1 A/dm$^2$ or more. More preferably, the polarity of the electrodes is inverted at predetermined time intervals. Still more preferably, the electrolytic bath to be used is sequentially changed.

There is also provided an apparatus for removing impurities from a liquid, which comprises an electrolytic bath consisting of a pressure vessel, in which electrodes of a metal which easily dissolves upon electrolysis are housed, and a constant current source for applying a voltage to said electrodes so as to obtain a predetermined current density in a liquid contained in said electrolytic bath, wherein impurities in the liquid are caused to flocculate by a hydroxide of the metal.

DETAILED DESCRIPTION OF THE PREFERRED EMBODIMENTS

The present invention will be described with reference to the accompanying drawings.

Figure 1:
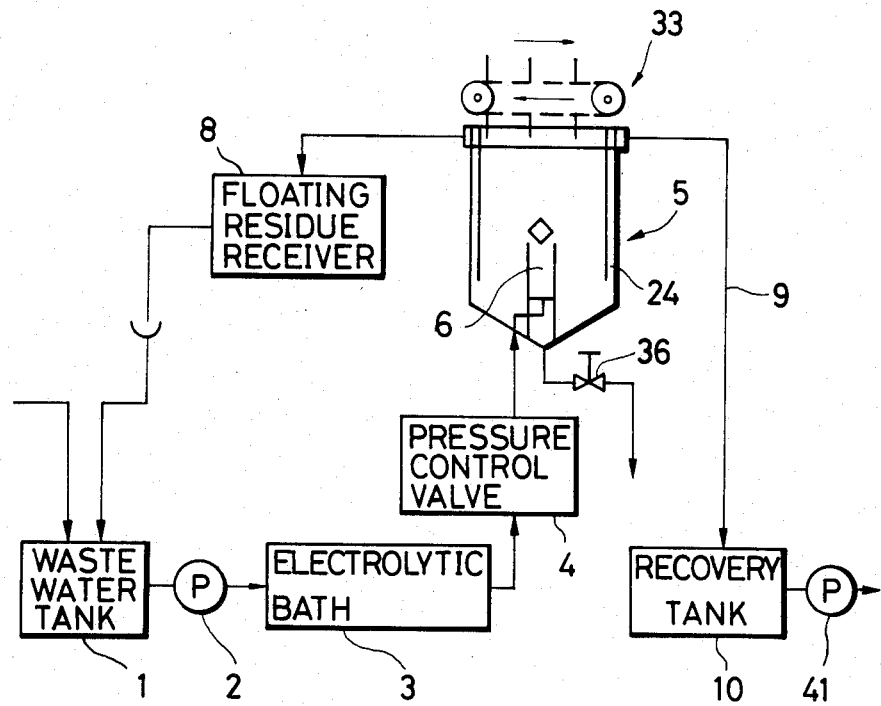
FIG. 1 is a schematic diagram showing an embodiment of the present invention.

Waste water containing impurities from an exhaust source is stored in a waste water tank 1, as shown in FIG. 1. The waste water is supplied to an electrolytic bath 3 (to be described later) by a high capacity fixed delivery pump 2 at a pressure higher than atmospheric pressure and is subjected to electrolysis. The electrolyzed waste water is released into the air through a pressure control valve 4 and is supplied through an inlet 6 into a flotation separation tank 5 (to be described later) at atmospheric pressure. Hydrogen gas produced and dissolved in the waste water upon electrolysis forms fine bubbles and rise in the tank 5. Impurities in the waste water in the electrolytic bath 3 flocculate and produce the flock. Hydrogen gas produced and not dissolved in the waste water in the electrolytic bath 3 upon electrolysis forms fine bubbles and attaches to the floc. The floc in the electrolytic bath 3 is produced by the flocculation of metal hydroxide formed by dissolution of the electrode metal in electrolysis. Most of the floc rise together with the fine bubbles in the flotation separation tank 5, is scraped off by a scraper 33, and is discharged into a floating residue receiver 8. Water from which the floc has been separated is passed through double walls 24 and supplied to a recovery tank 10 through a pipeline 9. The floc, to which fine bubbles are not attached, gradually settles, collects at the bottom of the flotation separation tank 5, and is discharged.

Figure 4A:
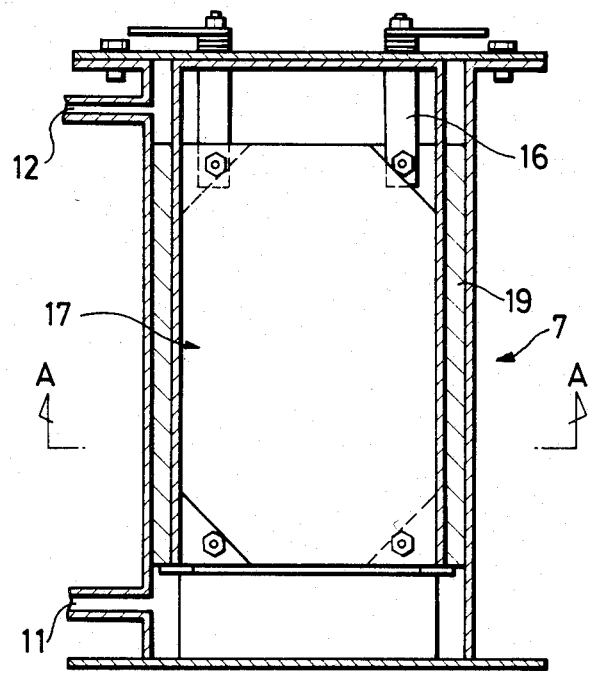
FIG. 4A is a longitudinal sectional view of the electrolytic bath shown in FIG. 1.

The outer housing of the electrolytic bath 3 is a pressure vessel 7 and consists of a synthetic resin with satisfactory insulating and sealing properties or a metal having an inner surface lined with such a synthetic resin. As shown in FIG. 4A, the electrolytic bath 3 has water inlet 11 and water outlet 12.

Figure 3:
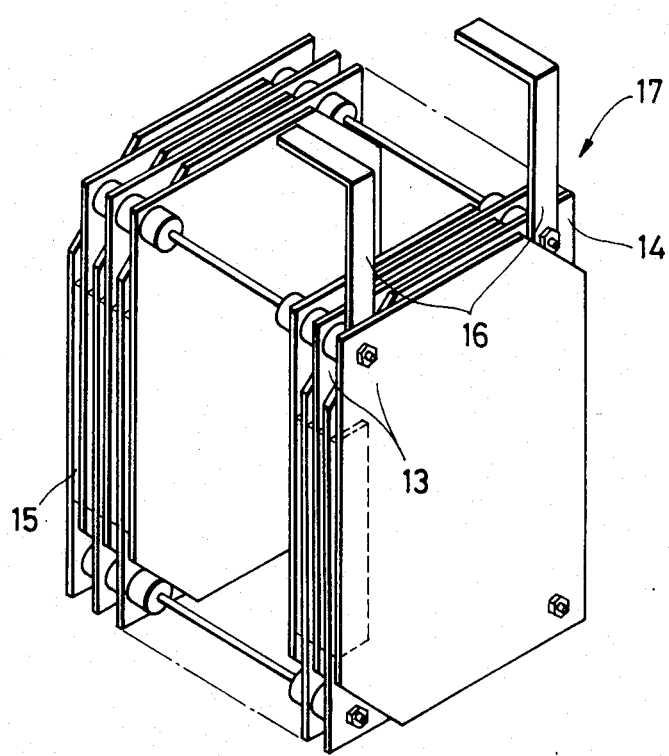
FIG. 3 is a perspective view of an electrode block.

A number of electrode plates 13 and 14 are arranged opposing each other inside the electrolytic bath 3, as shown in FIG. 3. The electrode plates 13 and 14 consist of a metal which easily dissolves upon electrolysis, such as copper, iron, zinc, nickel, or aluminum. The plates have a thickness of 1 to 5 mm.

Separating plates 15 are clamped between adjacent electrode plates 13 and 14. The separating plates 15 consist of a synthetic resin having satisfactory insulating properties such as a polyvinyl chloride. Each separating plate 15 has a thickness of 1 to 5 mm, a width of 5 mm or less, and a length of 100 mm or less.

More specifically, the electrode plates 13 and 14 are fixed through the separating plates 15 (of a predetermined thickness) at a gap between the electrodes so as to provide sufficient insulation and maintain a predetermined electrical conductivity. Lead wires 16, consisting of copper or the like, are connected to the respective electrode plates 13 and 14.

Figure 4B:
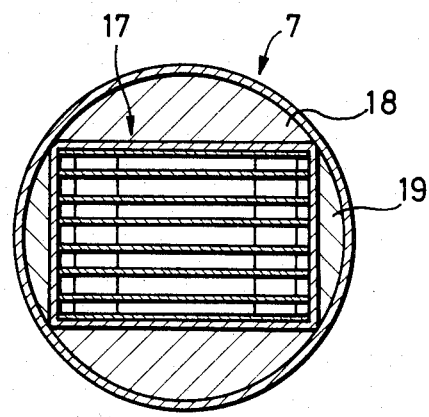
FIG. 4B is a cross-sectional view of the electrolytic bath shown in FIG. 1 taken along the line A—A in FIG. 4A.

In this manner, an electrode block 17 is constituted by the electrode plates 13 and 14, the separating plates 15, and the lead wires 16. As shown in FIGS. 4A and 4B, the electrode block 17 is housed in the pressure vessel 7. The separating plates 15 can be replaced with square or round rods having a side or diameter of 1 to 5 mm. Insulating packing materials 18 and 19 are packed between the electrode block 17 and the pressure vessel 7.

A constant current device (not shown) is connected to the lead wires 16. A voltage corresponding to the electrical conductivity of waste water is applied to the electrode plates 13 and 14 to obtain a predetermined current density.

The waste water forced into the electrolytic bath 3 from the inlet 11 is electrolyzed while passing through the gap between the electrode plates 13 and 14 at a predetermined speed, and discharged from the outlet 12. Upon electrolysis, the anode side metal of the electrode plates 13 and 14 dissolves to form a metal hydroxide. The metal hydroxide attaches to and flocculates impurities in the waste water such as suspended and dissolved substances to form the floc.

The floc and precipitated metal hydroxide partially attach to the anode side surfaces of the electrode plates 13 and 14.

When the current used for electrolysis is a DC current, the attachment of the floc and metal hydroxide occurs on either the electrode plates 13 or the electrode plates 14. Therefore, the path of waste water is narrowed and the electrolysis area is reduced with time. As a result, the current density abnormally increases and results in insufficient electrolysis. Finally, the separation of solids from the liquid becomes impossible.

When the current used for electrolysis is a DC current, only the anodes are dissolved and consumed, even if both the electrode plates 13 and 14 consist of the same metal. As a result, the plate lifetime during which electrolysis can be performed is reduced to half that obtained when both the electrode plates 13 and 14 are uniformly consumed.

In view of this problem, a polarity inversion device (not shown) is preferably interposed between the DC power source (not shown) and the electrolytic bath 3, so that the polarities of the electrode plates 13 and 14 are inverted at predetermined time intervals. With this arrangement, upon polarity inversion an anode to which the floc and the like are attached is switched to serve as a cathode, and it produces hydrogen gas. As a result, the impurites deposited on the cathode (which was an anode before polarity inversion) are removed. Thus, deposits of the floc and the like will not build up exclusively on a single type of electrode plate.

Even with this arrangement, the electrode plates 13 and 14 are finally consumed and cannot be used any longer. Before this point is reached, however, the gaps between the electrode plates 13 and 14 increase and the electrolysis areas of the electrode plates 13 and 14 gradually decrease. Thus, in the embodiment adopting a constant current system, a voltage applied between the electrode plates 13 and 14 is higher in this state.

Figure 2:
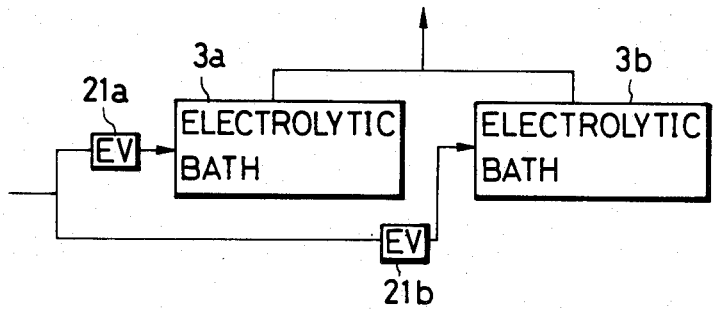
FIG. 2 is a block diagram showing connection of electrolytic baths.

As shown in FIG. 2, a plurality of electrolytic baths (3a and 3b in the illustration) are arranged. A voltmeter (not shown) is connected to the electrolysis power source system. When the measurement obtained with this voltmeter exceeds a predetermined value, those of solenoid valves 21a and 21b at the inlet of the electrolytic baths 3a and 3b which have been open are closed, and those which have been closed are opened. When the solenoid valves 21a and 21b are switched, power supply to the electrolytic baths 3a and 3b is also switched. When the electrolytic baths 3a and 3b are automatically switched in this manner, the electrode block 17 for the electrolytic baths 3a and 3b, which are not in operation, can be replaced with a new one as needed.

The treated water flowing from the outlets of the electrolytic baths 3a and 3b is supplied to the flotation separation tank 5 arranged above the electrolytic baths 3a and 3b.

Figure 5A:
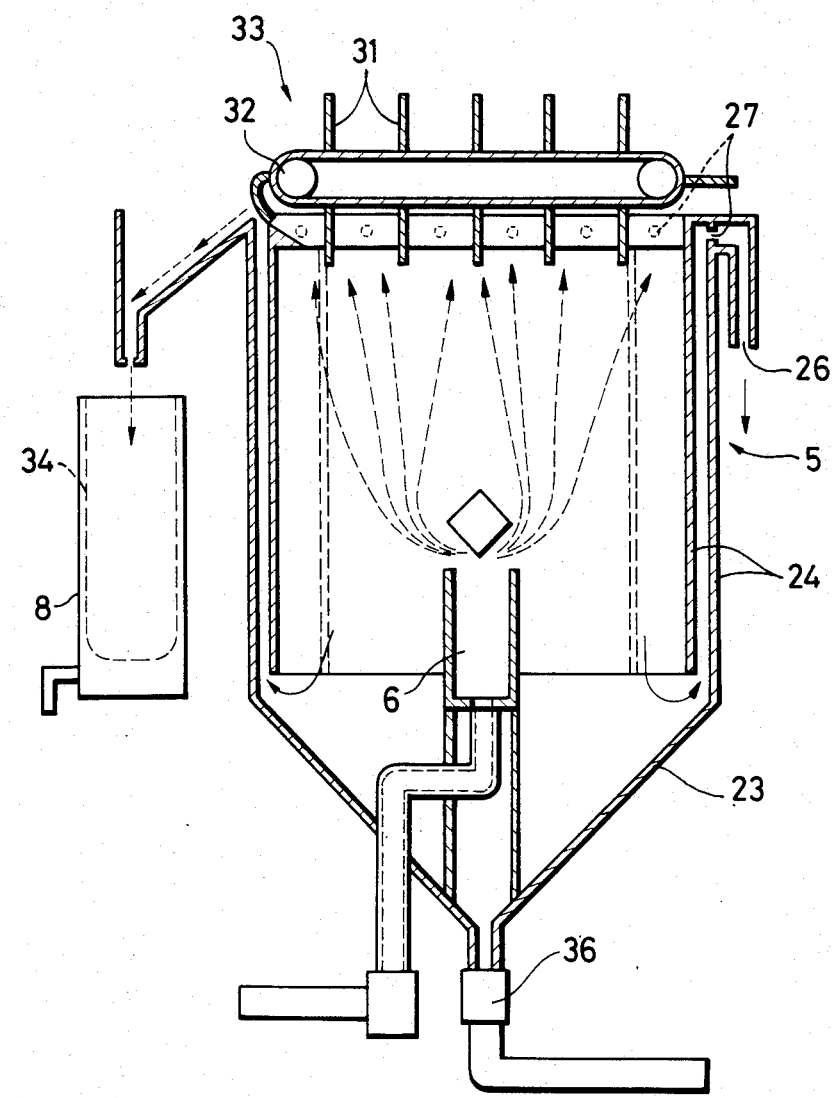
FIGS. 5A and 5B are longitudinal sectional views of the flotation separation tank shown in FIG. 1.
Figure 5B:
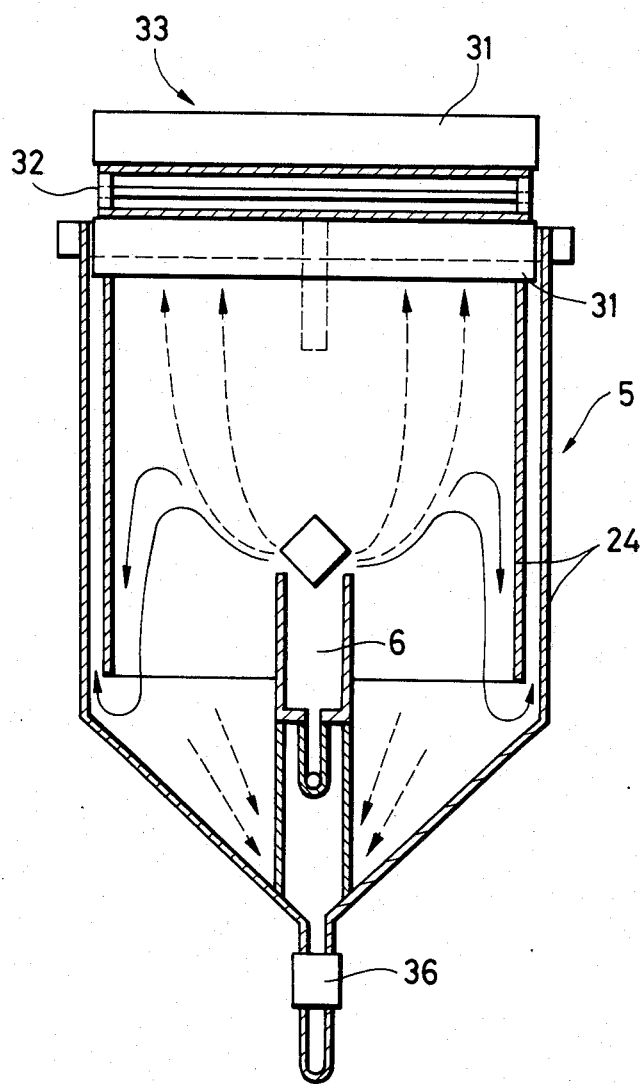

As shown in FIGS. 5A and 5B, the flotation separation tank 5 has a substantially conical bottom 23 and double walls 24 on each side. The inlet 6 of the flotation separation tank 5 projects upward from the bottom 23 and is located substantially at the center of the flotation separation tank 5. An outlet 26 of the flotation separation tank 5 communicates with the gap between the double walls 24 through small holes 27.

A scraper 33 is arranged above the flotation separation tank 5. Rubber or urethane foam scraper fins 31 of the scraper 33 may be moved by a chain 32 at a rate of several centimeters per minute. A plurality of floating residue receivers 8 having cloth or paper bags 34 are arranged near the side surfaces of the flotation separation tank 5. The floating residue receivers 8 communicate with the waste water tank 1.

The floc is supplied to the flotation separation tank 5 from the inlet 6 together with the treated water and hydrogen gas. Most of the floc then rises to the surface of the water in the flotation separation tank 5 and forms a floc layer. The floc layer is scraped off by the scraper 33 and is dumped into the floating residue receiver 8.

The floc dumped into the floating residue receiver 8 is collected by the bag 34 and the filtered water is returned to the waste water tank 1. A concentrated solid residue accumulates in the bag 34. When the weight of the solid residue in the bag 34 reaches a predetermined value, the floating residue receiver 8 is automatically replaced with an adjacent floating residue receiver (not shown).

A portion of the floc, to which an insufficient amount of hydrogen gas is attached, settles in the flotation separation tank 5. The bottom 23 is opened for a very short period of time with a predetermined time interval, and the floc settled on the bottom 23 is supplied to the floating residue receiver 8 together with the floating floc.

Some of the floc rise between the double walls 24 together with the treated water and are passed through the outlet 26 via the small holes 27.

The treated water passed through the outlet 26 is stored in the recovery tank 10 and is then supplied to an ultrafilter (not shown) by a pump 41. The floc not removed at the flotation separation tank 5 normally has a size of about 1 $\mu$m or more. For this reason, the ultrafilter uses a filtering material with a mesh of 0.5 $\mu$m. This filtering material is automatically replaced.

EXAMPLES 1–4 AND COMPARATIVE EXAMBLE 1

In the electrode block 17 shown in FIG. 3, the electrode plates 13 and 14 were constituted by copper plates having a width of 5.5 cm, a length of 2.0 cm, and a thickness of 2.0 mm such that the total electrolysis area of the opposing pairs was 16 dm$^2$. The separating plates 15 were polyvinyl chloride plates having a thickness of 2.0 mm. The electrode block was fixed in the pressure vessel to provide an electrolytic bath.

Waste water (specific conductivity = 102 $\mu$S/cm), in which silicon fine particles having an average diameter of 0.3 $\mu$m were dispersed and suspended at a concentration of 0.3 g/l, was treated by 100 l for each of the Examples and Comparative Example. The waste water was supplied to the electrolytic bath by a fixed delivery pump at a rate of 4 l/min at a predetermined pressure, and electrolysis was performed at a current density of 1 A/dm$^2$. The waste water supplied to the electrolytic bath under pressure was continuously supplied to the flotation separation tank 5 at atmospheric pressure illustrated in FIG. 1 through the pressure control valve. The amount of flocculated floc was measured in accordance with the following classification:

I: Floc floating on the surface of the flotation separation tank

II: Floc deposited on the bottom of the flotation separation tank

III: Floc remaining in the recovered water.

For classification I, the amount of floc scraped off by the scraper and dumped into the floating residue receiver was dried at 50° C. and measured.

For classification II, the valve at the bottom of the tank was opened 2 hours after electrolysis was completed. After the floc was dumped into another container together with about 5 l of water, the mixture was suction-filtered through a qualitative filter (Toyo Roshi K.K.), dried at 50° C. and measured.

For classification III, the floc was filtered under pressure using a filtering material with a mesh of 0.45 $\mu$m, dried at 50° C. and measured.

Figure 6:
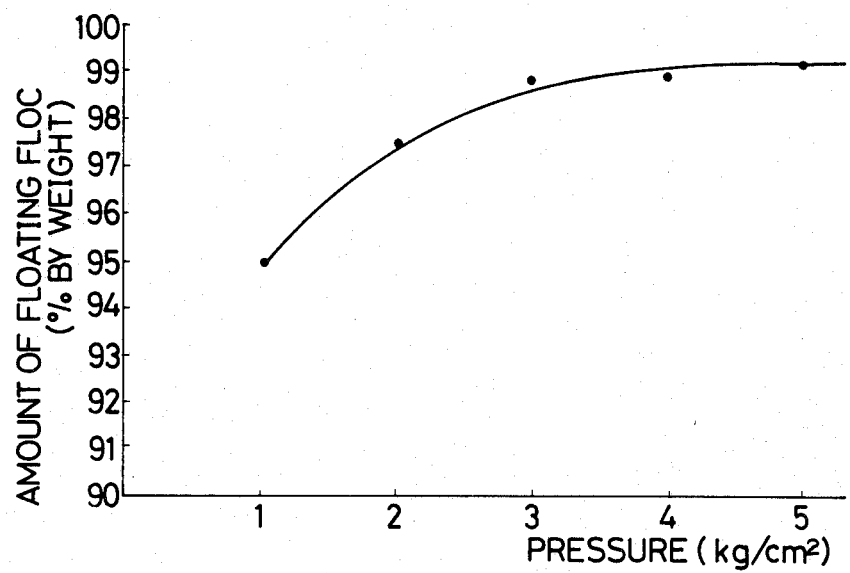
FIGS. 6 to 8 are graphs showing the relationship between the amount of floc and pressure during electrolysis in Examples 1 to 3 and Comparative Example 1.
Figure 7:
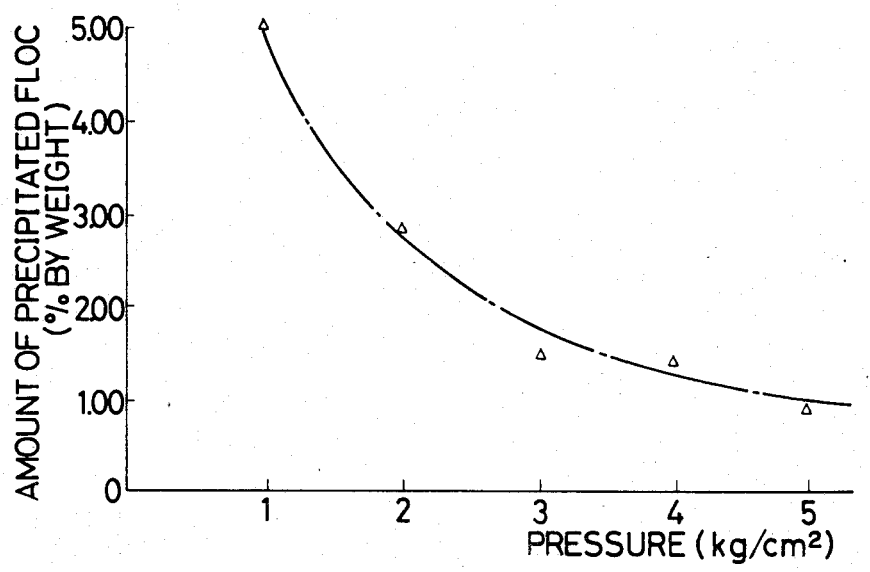
Figure 8:
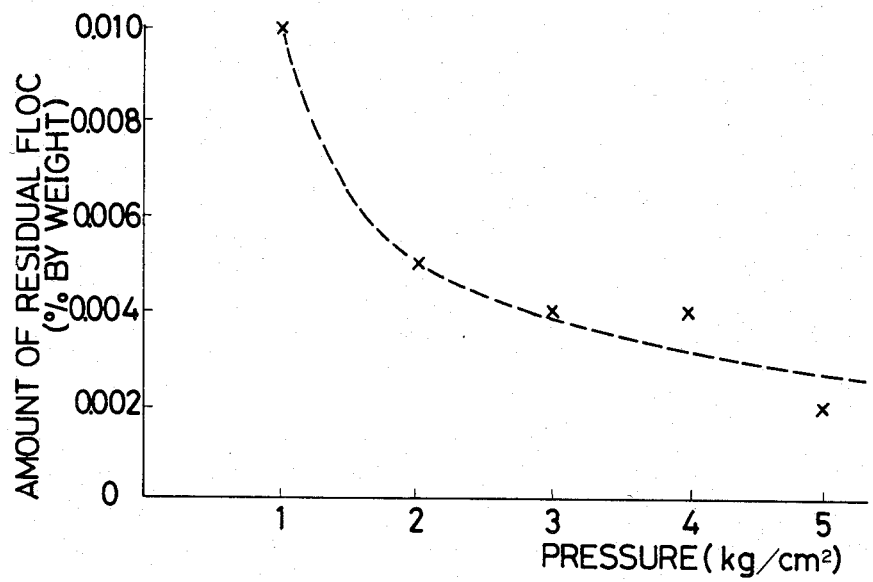

The pressure for feeding the waste water into the electrolytic bath was atmospheric pressure for a Comparative Example and was as indicated for four Examples. The results (measured amounts in % by weight of the flocs in relation to the total amount of the flocs) are shown in Table 1 below and in FIGS. 6 to 8.

TABLE 1

|  | No. | Pressure (Kg/cm$^2$) | Voltage (V) | Amount of Floc (wt %) | | |
| --- | --- | --- | --- | --- | --- | --- |
|  |  |  |  | I | II | III |
| Example | 1 | 2 | 20 | 97.4 | 2.595 | 0.005 |
|  | 2 | 3 | 18 | 98.6 | 1.496 | 0.004 |
|  | 3 | 4 | 16 | 98.7 | 1.398 | 0.004 |
|  | 4 | 5 | 14 | 99.1 | 0.999 | 0.002 |
| Comparative Example | 1 | 1 | 24 | 95.0 | 4.990 | 0.01 |

As can be seen from the above results, when compared with electrolysis at atmospheric pressure, the electrolysis under pressure has the following advantages:

(1) The amount of floc floating in the flotation separation tank is increased.

(2) Since the amount of floc mixed in with the recovered water is small, the consumption of industrial filtering material is small.

(3) When the pressure is increased, the voltage necessary for a constant current of 1 A/dm$^2$ is decreased.

EXAMPLES 5 AND 6

Using 100 l of waste water for each Example, the electrolysis and flotation separation tank treatment were performed following the same procedures as in Example 2 except that the current densities were 0.90 A/dm$^2$ and 0.85 A/dm$^2$. The results are shown in Table 2 below.

TABLE 2

|  | No. | Current Density (A/dm$^2$) | Amount of Floc (wt %) | | |
| --- | --- | --- | --- | --- | --- |
|  |  |  | I | II | III |
| Example | 5 | 0.90 | 98.8 | 2.193 | 0.007 |
|  | 6 | 0.85 | 97.9 | 2.091 | 0.009 |

As can be seen from the above results, when the electrolysis is performed under pressure, the current density can be decreased compared with the electrolysis at atmospheric pressure. This is because the diameter of bubbles of the hydrogen gas formed as fine bubbles is reduced as the pressure is increased, reduction of cathode area due to the bubbles is decreased, and loss of electrolysis efficiency is decreased.

During studies in establishing the present invention, the following facts were found. As shown in Table 3, when industrial waste water containing SS (suspended substance) at a ratio of 300 mg per 1 l of normal city tap water was subjected to electrolysis, filtered, and then deionized by an ion exchange resin, only a small portion of the dissolved silica in the industrial waste water was accounted for by silica ions. It was theoretically surmised that silica ions are adsorbed and removed by an anion exchange resin and colloidal suspended silica attaches to the metal hydroxide produced at the anode. The initial total amount of silica (79 mg/l) was reduced to 0.01–0.005 mg/l.

Based on this finding, the present inventor conducted Experiments 1–3 described below.

As a result, it has been found that among suspended colloidal silica and silicic ion in tap water or underground water, silicic ion is perfectly adsorbed and removed through conventional cation exchange resin, while most part of suspended colloidal silica is removed by electrolysis process for a predetermined period of time at a constant water flow rate and at a predetermined temperature (usually at ambient temperature) with an appropriate electric current density, wherein the anode is made of a metal which is water soluble and forms immediately its hydroxide when the water is weak alkaline having a pH of 9–7, and the cathode is made of a metal identical with that of anode or other metal, or carbon.

TABLE 3

Comparison of Compositions Before and After Recovery of Waste Water

| No. | Detection Item | Unit | After Recovery | Before Recovery |
| --- | --- | --- | --- | --- |
| 1 | pH |  | 7.2 | 4.65 |
| 2 | Electrical conductivity | $\mu$S/cm | 0.5–2.0 | 226 |
| 3 | Residual silica | mg/l | 0.01–0.005 | 79 |
| 4 | Total cations | mg/l | <0.3 | 124.2 |
| 5 | Ammonium ions | mg/l | <0.05 | — |
| 6 | Sodium ions | mg/l | 0.08–0.03 | 16.5 |
| 7 | Potassium ions | mg/l | Not detected | 2.1 |
| 8 | Calcium ions | mg CaCO$_3$/l | 0.4–0.1 | 50.0 |
| 9 | Magnesium ions | mg CaCO$_3$/l | 0.08–0.03 | 4.2 |
| 10 | Iron | mg/l | 0.10–0.02 | 10.5 |
| 11 | Manganese | mg/l | 0.05–0.02 | 2.3 |
| 12 | Other anions | mg/l | Not detected | Ni 0.4 |
| 13 | SS | mg/l | Not detected | 300 |

Measurements were performed by the atomic absorption spectroscopy for sodium and potassium ions, and in accordance with JIS K0101 for the others.

EXPERIMENT 1

Underground water having an electrical conductivity of 373 μScm was treated. Copper, nickel, iron, zinc, and aluminum plates having a thickness of 1 to 1.5 mm were cut into electrode plates having a width of 10 cm and a length of 20 cm. The electrode plates were combined as shown in Table 4. The gap between the adjacent electrodes was 5 mm. Three metal plates serving as cathodes and two metal plates serving as anodes were alternately opposed to each other such that the total electolysis area on the anode side was 4 dm$^2$.

Electrolysis by the constant current system was performed, flowing water at a rate of 1 l per minute under the conditions shown in Table 4. The treated water was filtered by a qualitative filter (Toyo Roshi K. K.), and silicic acid in the filtered water was measured by the atomic absorption spectroscopy. The results are shown in Table 4 below.

TABLE 4

| No. | Electrode Metal Cathode | Electrode Metal Anode | Voltage (V) | Current Density (A/dm$^2$) | Silicic Acid Measured Value (ppm) | Silicic Acid Reduction (%) |
|---|---|---|---|---|---|---|
| | Untreated Water | | — | — | 29.6 | — |
| 1 | Cu | Zn | 10 | 1 | 10.0 | 66.2 |
| 2 | Cu | Al | 10 | 1 | 11.6 | 60.8 |
| 3 | Cu | Fe | 10 | 1 | 19.7 | 33.4 |
| 4 | Fe | Cu | 10 | 1 | 22.3 | 24.6 |
| 5 | Cu | Ni | 10 | 1 | 19.7 | 33.4 |
| | Untreated Water | | — | — | 32.6 | — |
| 6 | Cu | Zn | 20 | 2 | 4.7 | 85.5 |
| 7 | Cu | Al | 20 | 2 | 2.8 | 91.4 |
| 8 | Cu | Fe | 20 | 2 | 10.9 | 66.5 |
| 9 | Fe | Cu | 18 | 2 | 18.4 | 43.5 |
| 10 | Cu | Ni | 20 | 2 | 15.0 | 54.0 |

The above results indicate that zinc and aluminum can be used as an electrode metal for effective removal of silicic acid.

In order to determine the effects of reducing the gap between the electrodes, the following Experiment 2 was performed.

EXPERIMENT 2

Untreated water having an electrical conductivity of 150 μScm was used. Five zinc or aluminum plates, each having a thickness of 1 mm were placed at a gap of 2 mm such that cathodes and anodes were alternately opposed and the total electrolysis area was 4 dm$^2$. The water was passed through the gap between the electrodes at a rate of 1 l per minute, and the electrolysis was performed at indicated current densities. The amount of silicic acid in the filtered water was measured following the same procedures as in Experiment 1. The results are shown in Table 5.

TABLE 5

| No. | Electrode Metal | voltage (V) | Current Density (A/dm$^2$) | Silicic Acid Measured Value (ppm) | Silicic Acid Reduction (%) |
|---|---|---|---|---|---|
| | Untreated Water | — | — | 29.3 | — |
| 1 | Zn | 12 | 1 | 13.0 | 55.5 |
| 2 | Al | 20 | 1 | 10.9 | 63.0 |
| 3 | Zn | 30 | 2 | 5.3 | 81.9 |
| 4 | Al | 39.5 | 2 | 4.3 | 85.3 |

It was found that particularly when aluminum plates were used as electrode plates, an oxide or hydroxide film which formed on the anodes blocked the path of the water and the voltage increased abruptly. That is, part of the flocculated substance or metal hydroxide attaches to the anodes when the polarities of the current used for electrolysis are fixed. Therefore, the treated water path is narrowed and the electrolysis area is reduced, resulting in insufficient electrolysis.

In order to find a means to prevent such a problem when the electrode gap is reduced, the following experiment 3 was performed as below.

EXPERIMENT 3

Untreated water having an electrical conductivity of 150 μScm was used. Zinc or aluminum plates having a thickness of 1 mm or magnesium plates having a thickness of 3.5 mm were used as electrodes, and the electrolysis was performed following the same procedures as in Experiment 2. The effects obtained when the polarities of the current were inverted was determined. The results are shown in Table 6.

TABLE 6

| No. | Electrode Metal | Polarity Inversion (once/5 sec) | Voltage (V) | Current Density (A/dm$^2$) | Silicic Acid Measured Value (ppm) | Silicic Acid Reduction (%) |
|---|---|---|---|---|---|---|
| | Untreated Water | | — | — | 40.7 | — |
| 1 | Zn | Not performed | 12 | 1 | 14.2 | 65.2 |
| 2 | Al | Not performed | 30 | 0.5 | 25.2 | 38.1 |
| 3 | Zn | performed | 30 | 1.5 | 9.6 | 76.4 |
| 4 | Al | performed | 20 | 0.6 | 24.0 | 41.0 |
| 5 | Mg | performed | 8 | 0.5 | 16.9 | 52.1 |
| 6 | Mg | performed | 14 | 1 | 8.8 | 75.1 |
| 7 | Mg | performed | 30 | 2.0 | 1.8 | 95.0 |

In this experiment, when polarity inversion was performed, no attachment of hydroxide and the like to the electrodes was observed, and the voltage did not increase.

Figure 9:
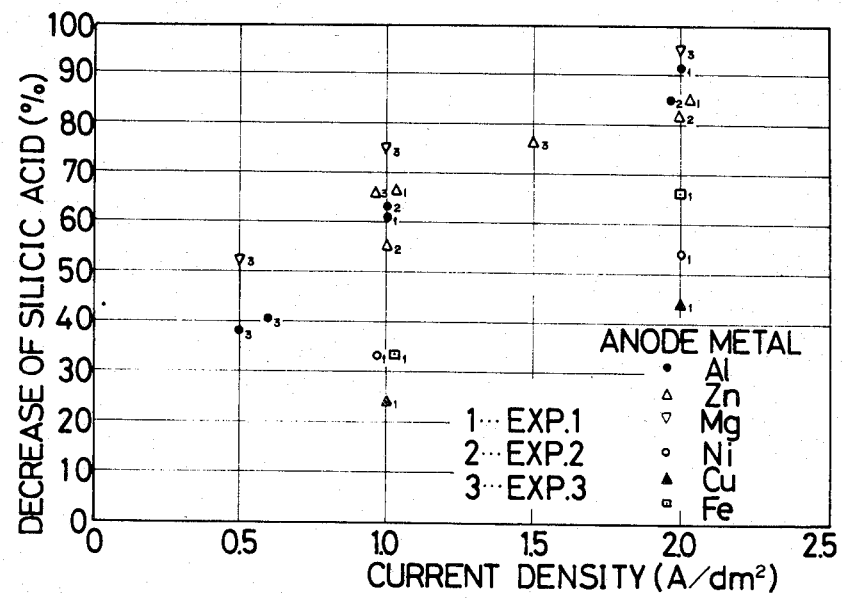
FIG. 9 is a graph showing the relationship between current density and decrease of silicic acid.

The results obtained in Experiments 1 to 3 are summarized in FIG. 9.

EXAMPLES 1–4 AND COMPARATIVE EXAMPLES AND 2 and 3

Untreated water having an electrical conductivity of 157 μScm was used. Zinc or aluminum electrodes having a thickness of 1 mm were used at an electrode gap of 2 mm such that the electrolysis area was 16 dm$^2$. The electrolysis was performed at a pressure of 3 kg/cm$^2$ by the pressurizing method of the present invention. Polarity inversion (once per 5 sec) was performed while the electrolysis was performed at a rate of 4 l/min. The amount of silicic acid in the treated water was measured as in Experiment 1. The results are shown in Table 7.

TABLE 7

|  | No. | Electrode Metal | Voltage (V) | Current Density (A/dm²) | Silicic Acid Measured Value (ppm) | Reduction (%) |
|---|---|---|---|---|---|---|
| Untreated Water | | | — | — | 38.5 | — |
| Example | 1 | Zn | 8 | 0.5 | 29.2 | 24.2 |
|  | 2 | Al | 16 | 0.5 | 24.4 | 36.6 |
|  | 3 | Zn | 16 | 1 | 15.7 | 59.2 |
|  | 4 | Al | 20 | 1 | 16.6 | 56.8 |
| Comparative Example | 2 | Ni | 30 | 0.5 | 36.2 | 6.0 |
|  | 3 | Ni | 30 | 1 | 30.8 | 20.1 |

I claim:

1. A method of removing impurities from a liquid, comprising the steps of:

forming electrodes using a metal which easily dissolves upon electrolysis and produces a hydroxide;

installing said electrodes in a pressure vessel;

continuously supplying a liquid containing impurities from an inlet of said pressure vessel at a pressure higher than atmospheric pressure;

continuously supplying the liquid from an outlet of said pressure vessel to an inlet of a tank at atmospheric pressure;

continuously discharging the liquid from an outlet of said tank;

performing electrolysis by applying a voltage to said electrodes while the liquid is passed through said pressure vessel, thereby causing the impurities to flocculate; and passing the liquid through the pressure vessel and the tank, wherein the then produced fine bubbles attached to the flocculated impurities to rise to the surface and seperate the impurities.

2. A method according to claim 1, wherein the impurities in the liquid are silicic acid ions and colloidal silicic acid in water, and the electrodes consist of a material selected from the group consisting of aluminum, zinc and magnesium.

3. A method according to claim 1, wherein the polarity of said electrodes is inverted at predetermined time intervals.

4. A method according to claim 2, wherein the polarity of said electrodes is inverted at predetermined time intervals, and a voltage is applied between said electrodes so as to provide a current density of not less than 1 A/dm².

5. A method according to any one of claims 1 to 4, wherein an electrolytic bath to be used is sequentially changed when the voltage has exceeded a predetermined value.

6. An apparatus comprising an electrolytic bath consisting of a pressure vessel, in which electrodes of a metal which easily dissolves upon electrolysis are housed, and a constant current source for applying a voltage to said electrodes so as to obtain a predetermined current density in a liquid contained in said electrolytic bath, wherein impurities in the liquid are caused to flocculate by a hydroxide of the metal.

7. An apparatus according to claim 6, further comprising a polarity inversion unit for inverting the polarity of said electrodes at predetermined time intervals.

8. An apparatus according to claim 6 or 7, further comprising a plurality of electrolytic baths provided with said electrodes therein, a voltmeter for measuring the voltage, and a switching unit for switching among said plurality of electrolytic baths the one bath to another bath to be used when a read on said voltmeter for said one bath has exceeded a predetermined value.

9. An apparatus according to claim 6 or 7, wherein said electrodes consist of a material selected from the group consisting of aluminum, zinc and magnesium.

* * * * *

UNITED STATES PATENT AND TRADEMARK OFFICE
CERTIFICATE OF CORRECTION

PATENT NO. : 4,623,436

DATED : November 18, 1986

INVENTOR(S) : YOSHIO UMEHARA

It is certified that error appears in the above-identified patent and that said Letters Patent is hereby corrected as shown below:

Claim 1, column 11, line 34, delete "to", second occurrence.

Claim 1, column 11, line 35, change "seperate" to --separate--.

Signed and Sealed this

Tenth Day of February, 1987

Attest:

DONALD J. QUIGG

Attesting Officer

Commissioner of Patents and Trademarks